United States Patent [19]

Fischer

[11] Patent Number: 4,527,106
[45] Date of Patent: Jul. 2, 1985

[54] WINDSHIELD WIPER CONTROL SYSTEM WITH IMPROVED PRECIPITATION SENSOR

[76] Inventor: Glenn N. Fischer, 7595 E. Singer Rd., Dayton, Ohio 45424

[21] Appl. No.: 591,716

[22] Filed: Mar. 21, 1984

[51] Int. Cl.³ .......................... B60S 1/04; H01H 29/00
[52] U.S. Cl. ..................................... 318/483; 318/444; 318/DIG. 2; 15/250 C; 200/61.05
[58] Field of Search .......................... 200/61.04, 61.05; 15/250 C; 318/443, 444, 483, 643, DIG. 2; 307/10 R

[56] References Cited

U.S. PATENT DOCUMENTS

| | | | |
|---|---|---|---|
| 1,482,448 | 2/1924 | Sullivan | 15/50.12 |
| 2,407,215 | 9/1946 | Anderson | 15/250.02 |
| 2,802,694 | 8/1957 | Murray | 318/483 X |
| 2,823,346 | 2/1958 | Weber | 318/483 |
| 3,307,095 | 2/1967 | Redmond | 318/483 |
| 3,555,289 | 1/1971 | Sobkow | 318/483 X |
| 3,649,898 | 3/1972 | Inoue | 318/483 |
| 3,786,330 | 1/1974 | Inoue et al. | 318/483 |
| 4,010,383 | 3/1977 | Grassmann | 318/483 X |
| 4,317,073 | 2/1982 | Blaszkowski | 318/483 |
| 4,375,610 | 3/1983 | Nagaoka et al. | 318/444 |
| 4,378,484 | 3/1983 | Kunert | 219/203 |

FOREIGN PATENT DOCUMENTS 1150384 4/1969 United Kingdom ................ 318/483

Primary Examiner—William M. Shoop
Assistant Examiner—Bentsu Ro
Attorney, Agent, or Firm—Biebel, French & Nauman

[57] ABSTRACT

A control system activates motor vehicle windshield wipers when an improved sensing element senses precipitation. The element comprises a thin, substantially planar sheet of electrically insulating material which is impervious to precipitation. First and second electrodes are secured to the sheet and in gapless contact therewith to form a precipitation sensing edge. The element is preferably supported at one end within the center of a trough formed within a holder to present the sensing edge to the atmosphere. The holder facilitates mounting and also protects the element from damage. The first and second electrodes may comprise: thin, substantially planar electrodes coextensive with the sheet; substantially planar electrodes which taper toward the sensing edge; segmented planar electrodes in which alternate segments on opposite sides of the element are removed and present varying percentages of overlap between diagonally adjacent opposite electrodes; and, wires embedded in opposite sides of the edge of an insulating sheet. The electrical resistance between the electrodes is lowered momentarily by drops of water with the lowered resistance being sensed by a control circuit which stretches the momentary period of lowered resistance to a period of time sufficient to operate the windshield wipers through a complete operating cycle.

22 Claims, 15 Drawing Figures

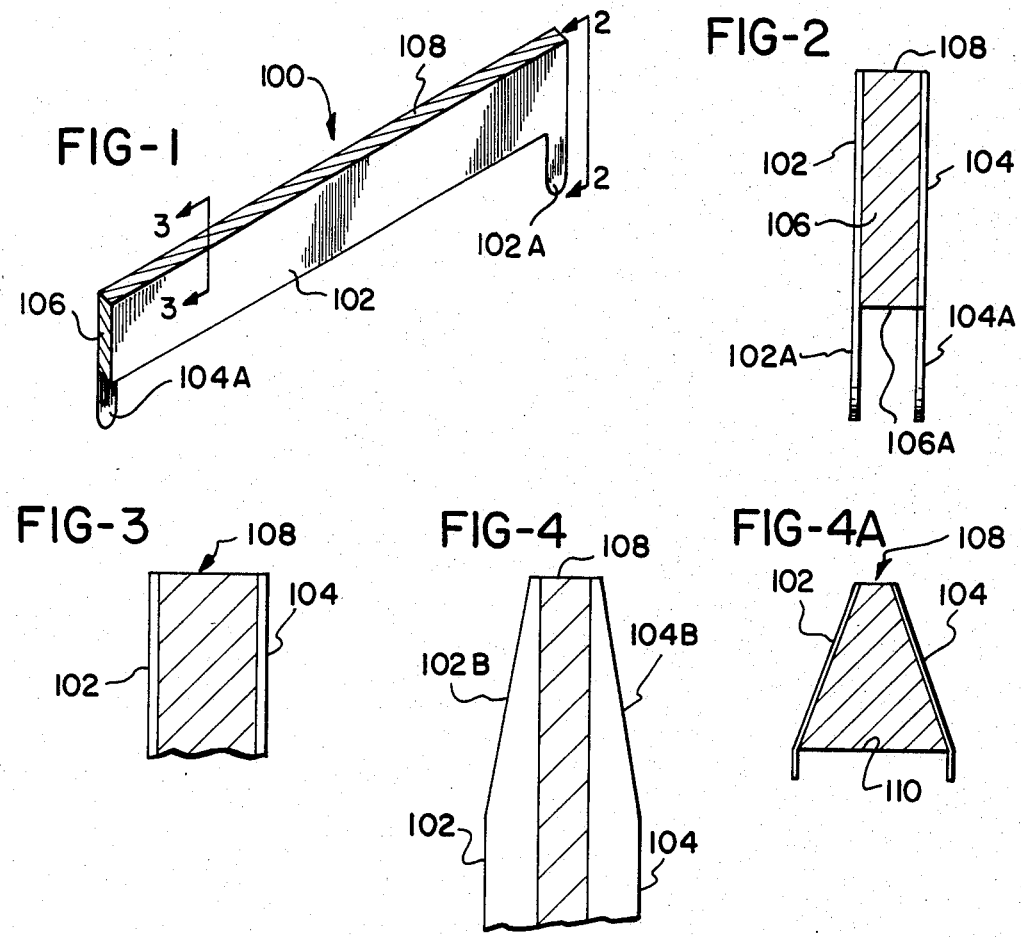
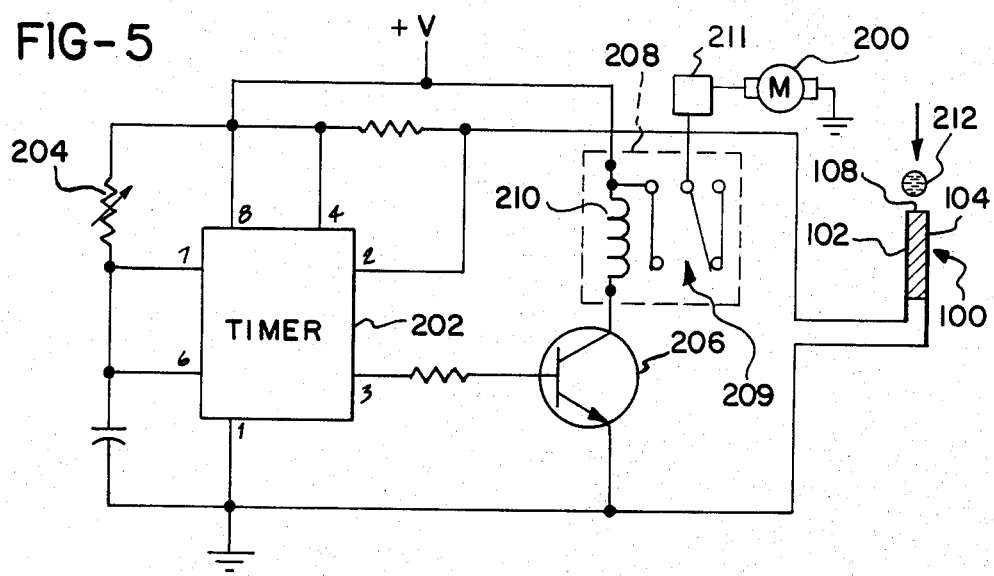

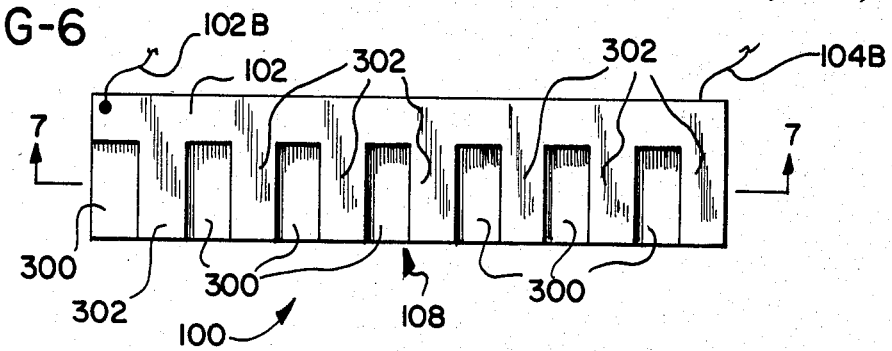
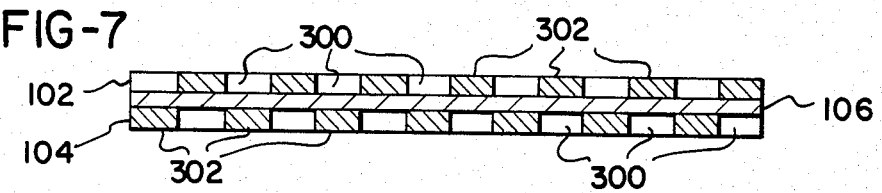
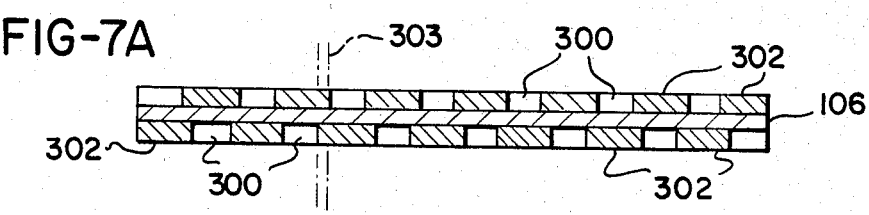
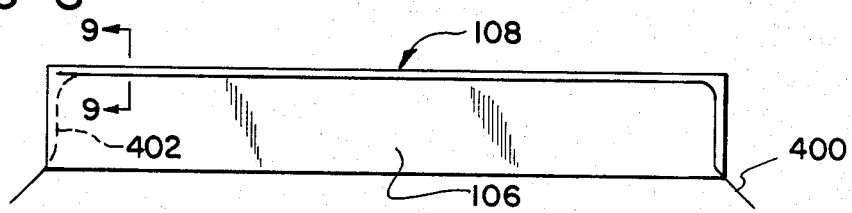
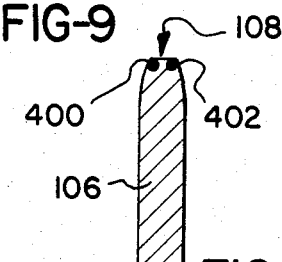
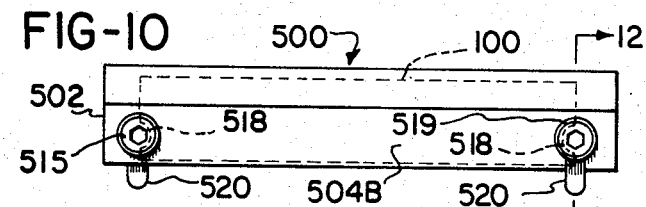
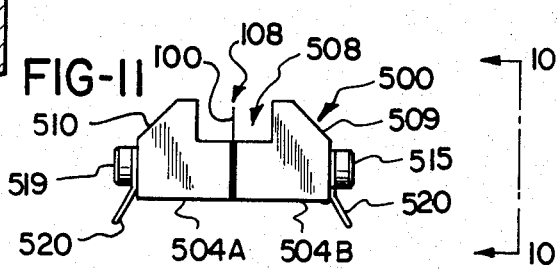

WINDSHIELD WIPER CONTROL SYSTEM WITH IMPROVED PRECIPITATION SENSOR

BACKGROUND OF THE INVENTION

The present invention relates generally to automatic windshield wiper control systems wherein the windshield wipers of a motor vehicle are activated in response to sensed precipitation and, more particularly to such a windshield wiper control system including an improved precipitation sensing element.

A variety of automatic control systems are known for activating the windshield wipers of a motor vehicle in response to sensed precipitation. These systems utilize various types of precipitation sensors which include, for example, a microwave sensing system as disclosed in U.S. Pat. No. 3,786,330. More conventional precipitation sensors typically include pairs of parallel or interleaved electrical conductors which are formed onto substantially planar surfaces.

These more conventional detectors often form a portion of the windshield of a motor vehicle or are connected to the windshield such that they can be "cleared", i.e., returned to a nonprecipitation indicating state, by means of the wiper blades of the windshield wiper system or an auxiliary wiping device activated thereby. See, for example, U.S. Pat. Nos. 1,482,448; 2,407,215; and 3,555,289.

Alternatively, the precipitation sensing elements are cleared by heating as disclosed in U.S. Pat. No. 4,317,073 or by means of centrifugal force as disclosed in U.S. Pat. No. 3,649,898.

Self-clearing precipitation sensors are known in the art, for example, as disclosed in U.S. Pat. Nos. 2,823,346 and 4,010,383. However, known self-clearing precipitation sensors are difficult to construct requiring a series of closely interwoven wires in the former patent and precision formed and placed comb-like sensor elements in the latter patent. It is thus apparent that the need exists for a self-clearing precipitation sensing element which is easily constructed and, hence, inexpensive.

SUMMARY OF THE INVENTION

In accordance with the present invention, a windshield wiper control system activates the windshield wipers of a motor vehicle in response to signals generated by an improved precipitation sensing element. The improved precipitation sensing element comprises electrically insulating means formed from electrically insulating material which is impervious to precipitation which impinges thereon and may comprise, for example, tetrafluoroethylene.

The electrically insulating means is formed to define a thin edge of insulating material and, in several embodiments of the present invention, comprises a thin, substantially planar sheet of the insulating material. First and second electrode means for signaling the presence of precipitation are secured to the insulating means at opposite sides of the thin edge such that the first and second electrodes are separated by the insulating material and in gapless contact therewith to form a precipitation sensing edge.

The first and second electrodes and separating insulating material are otherwise sized to make the precipitation sensing element sufficiently rigid for cantilevered support to present the sensing edge to the atmosphere for contact by precipitation which may fall thereon. The first and second electrodes normally present a first high resistance value therebetween which is substantially reduced for a momentary period of time upon impingement of precipitation upon the sensing edge. The period of reduced resistance between the first and second electrodes is brief due to the fact that the impinging precipitation is rapidly conducted away from the sensing edge to the first and second electrodes by the effects of surface tension.

Wiper control circuit means are connected to the improved precipitation sensing element for sensing the momentarily lowered resistance between the first and second electrodes to generate a windshield wiper activating signal substantially exceeding the momentary time period of lowered resistance.

In one embodiment of the improved precipitation sensing element, the first and second electrode means comprise substantially planar first and second metallic electrodes which are substantially coextensive with the insulating material. The substantially planar metallic electrodes are preferably thin to define the precipitation sensing edge of the sensing element; however, the first and second planar metallic electrodes may be substantially increased in thickness and tapered toward the sensing edge of the element to increase the mechanical strength of the element without increasing the width of the sensing edge.

Another alternate embodiment of the improved precipitation sensor in accordance with the present invention provides for selective sensitivity of the sensor by removing selected alternate segments of the first and second planar metallic electrodes, which segments are adjacent to the sensing edge of the sensor. The sensitivity of the resulting sensing element may be increased or decreased by respectively increasing or decreasing the number of segments along the sensing edge. Sensor sensitivities are further alterable by expanding the remaining segments of the first and second electrodes to permit a selected percentage of overlap between the remaining diagonally adjacent segments located on opposite sides of the sensors.

An additional alternate embodiment of the improved sensor may be constructed by forming the first and second electrode means as first and second wires embedded into opposite sides of the thin edge of insulating material defined by the insulating means to form a sensing edge for the sensor.

The improved sensing elements in accordance with the present invention are preferably supported by sensing element holders which comprise generally rectangular blocks having a trough formed in one side. The sensing holders include sensing element securing means for cantilevered support of sensing elements from approximately the center of the bottom of the trough in the holder such that the sensing element extends outwardly from the center of the bottom of the trough with the distal end of the sensing element being the sensing edge. The edges of the trough extend to at least the height of the sensing edge of the element such that the element is protected from potentially damaging contacts and the sensing edge is exposed within the trough to sense incident precipitation.

Control circuit means complete the windshield wiper control system and comprise switching means for connecting power to activate a windshield wiper motor of a motor vehicle and sensor monitoring means for activating the switching means in response to the momentary lowering of the electrical resistance between the first and second electrodes of an improved precipitation sensing element. The sensor monitor stretches the momentary time period of lowered resistance to a period of time sufficient to effect operation of the windshield wipers through a complete operating cycle.

It is, therefore, an object of the present invention to provide a windshield wiper control system for activating the windshield wipers of a motor vehicle in response to sensed precipitation including an improved precipitation sensing element.

It is another object of the present invention to provide an improved windshield wiper control system for activating the windshield wipers of a motor vehicle in response to sensed precipitation wherein an improved precipitation sensing element comprises a thin, substantially planar sheet of electrically insulating material which is impervious to precipitation with first and second electrode means being secured to the opposite sides of the sheet at least near one edge thereof to define a self-clearing precipitation sensing edge whereby incident precipitation produces momentary periods of reduced electrical resistance between the first and second electrodes, which momentary reductions in the electrical resistance are sensed by a control circuit which stretches those momentary periods to time periods which are sufficient to effect operation of a motor vehicle windshield wiper system through a complete operating cycle.

Other objects and advantages of the invention will be apparent from the following description, the accompanying drawings and the appended claims.

BRIEF DESCRIPTION OF THE DRAWINGS

FIG. 1 is a perspective view of one embodiment of an improved precipitation element for use in the windshield wiper control system in accordance with the present invention.

FIG. 2 is an end view of the improved precipitation sensing element of FIG. 1.

FIG. 3 is a fragmentary sectional view taken along the section line 3—3 showing the sensing edge of the precipitation sensing element of FIG. 1.

FIG. 4 is a fragmentary sectional view corresponding to the view of FIG. 3 wherein an alternate embodiment of the sensing element has electrodes which taper toward the sensing edge.

FIG. 4A is an end view of an alternate embodiment of an improved sensing element including a triangularly shaped block of insulating material.

FIG. 5 is a schematic diagram of an illustrative embodiment of a wiper control circuit utilizing an improved precipitation sensing element.

FIG. 6 is an alternate embodiment of an improved precipitation sensing element.

FIG. 7 is a cross-sectional view taken along the section line 7—7 of FIG. 6.

FIG. 7A is a sectional view of an alternate embodiment of the sensing element of FIG. 6 showing overlap between the remaining diagonally opposite segments of the sensing element electrodes.

FIG. 8 is an alternate embodiment of an improved precipitation sensing element.

FIG. 9 is a fragmentary sectional view taken along the section line 9—9 of FIG. 8 to show the sensing edge of the improved precipitation sensing element of FIG. 8.

FIGS. 10-12 are front, end and sectional views, respectively, of a sensing element holder for employing an improved precipitation sensing element of the present invention.

DETAILED DESCRIPTION OF THE INVENTION

Figure 12:
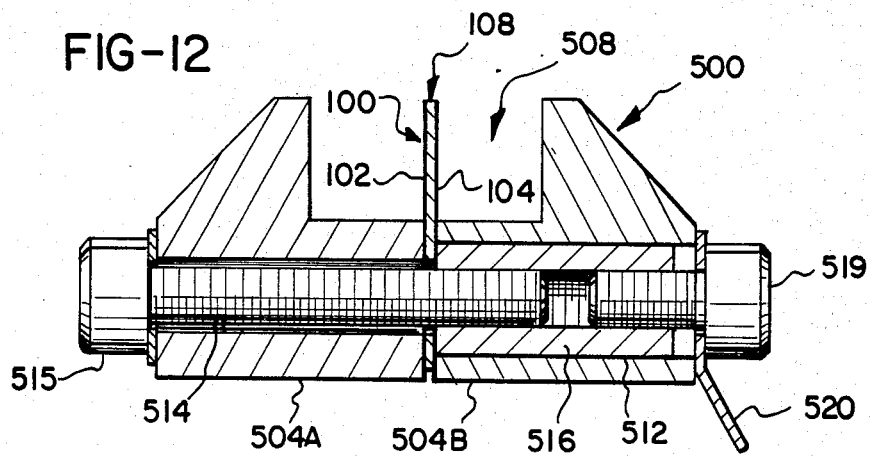

A first embodiment of an improved precipitation sensing element 100 is shown in FIGS. 1-3. The improved sensing element 100 comprises first and second electrode means or electrodes 102 and 104 with a thin, substantially planar sheet 106 of electrically insulating material sandwiched therebetween. The thickness of the insulating material sheet 106 at the sensing edge 108 of the element is such that a small droplet of moisture will bridge the two electrodes 102 and 104 across the end face of the insulating material sheet 106.

The electrically insulating material sheet 106 is formed from a material which will not absorb or adsorb precipitation (water) and one upon which water will form beads rather than a continuous film. An example of such an electrically insulating material is tetrafluoroethylene sold by The DuPont Company under the trademark Teflon.

In the embodiment of FIG. 1, the electrodes 102 and 104 are substantially coextensive with the insulating material sheet 106. The electrodes 102 and 104 include connecting tabs 102A and 104A, respectively, to permit ease of electrical connection thereto. The electrodes 102 and 104 are preferably bonded to the electrically insulating material sheet 106 such that there is no air gap between the electrodes 102 and 104 and the sheet 106 into which moisture can be attracted by capillary action. Of course, alternate arrangements including clamping can be envisioned to secure the electrodes 102 and 104 to the insulating sheet material 106.

The electrodes 102 and 104, as shown in FIGS. 1-3, are sufficiently thin that they can be formed from substantially planar sheets of electrically conductive metallic material. The thinness of the electrodes, at least at a sensing edge 108 of the element 100, is important to accelerate wetting out of the moisture onto the faces of the electrodes or the sides of the sensing element to thereby draw moisture away from the sensing edge 108. By monitoring the electrodes 102 and 104, changes in the electrical resistance therebetween can be detected when precipitation or drops of moisture impinge upon the sensing edge 108.

Normally, the electrical resistance between the electrodes 102 and 104 is quite high, approximating an open circuit or infinite resistance. When precipitation or a drop of water impinges upon the sensing edge 108 of the element and, hence, interconnects the electrodes 102 and 104, the electrical resistance therebetween is momentarily lowered to a significantly lower resistance value of 50,000 ohms or less.

Because of the moisture drawing characteristics of the electrodes 102 and 104 when combined with the electrically insulating material sheet 106 sandwiched therebetween, the precipitation sensing element 100 of the present invention is self-clearing in that any drop of water impinging upon the sensing edge 108 is rapidly drawn away from the sensing edge 108 to the faces of the electrodes 102 and 104. Thus, the improved sensing elements of the present invention are self-clearing, i.e., rapidly return to the normally high interelectrode electrical resistance approximating infinity, after the sensing edge 108 has been struck by a drop of water. The momentary change in resistance value is monitored to generate an extended windshield wiper motor activating signal as will be described with reference to FIG. 5.

Since the precipitation sensing edge 108 must be exposed to receive any ambient precipitation, the sensing element 100 is supported near the base edge 106A of the insulating sheet 106 to extend the element 100 in a self-supporting manner with the sensing edge 108 at its distal end. In the event that the thin electrodes and insulating sheet of the embodiment of the sensing element 100 of FIG. 1 do not provide sufficient rigidity for such "cantilevered" self-support, the electrodes 102 and 104 may be thickened to increase the mechanical strength of the sensing element 100. In that event, the edges of the electrodes 102B and 104B are tapered toward the sensing edge 108 of the sensing element 100 as shown in FIG. 4.

It is to be noted that other configurations of the insulating material and electrodes, such as a triangular block of insulating material 110 with thin electrodes 102 and 104 formed on the sides thereof as shown in FIG. 4A, would provide additional rigidity and yet still define the precipitation sensing edge 108 required by a sensing element in accordance with the present invention. Other modifications and embodiments similar to those shown in FIG. 4A will be apparent to those skilled in the art and are considered to be within the scope of the present invention.

FIG. 5 is a schematic diagram of an illustrative embodiment of control circuit means for the windshield wiper control system in accordance with the present invention. The control circuit means of FIG. 5 performs both a timing and a switching function for control of a windshield wiper motor 200. The timing function is performed by a general purpose timer circuit 202 referred to in the industry as a 555 timer. The 555 timer is commercially available from a variety of sources, for example, an appropriate timer is identified as an ICM 7555 timer which is available from the Intersel Corporation.

Timer circuit 202 is connected as a monostable multivibrator which is triggered by a high-to-low transition of the signal on the trigger input terminal 2 of the timer circuit 202. In response to the trigger signal, a positive-going output pulse is generated on the output terminal 3 of the timer circuit 202. The duration of the output pulse generated on terminal 3 is controlled by the resistance value of a variable resistor 204 as is characteristic of the well known 555 timer circuit 202.

The switching function of the control circuit of FIG. 5 which serves to activate the windshield wiper motor 200 is performed by an NPN transistor 206 which is connected to drive a relay circuit 208. A normally open contact 209 of the relay circuit 208 is connected to provide battery potential, typically +12 volts, to the windshield wiper motor 200 when the relay coil 210 is activated by the transistor 206. Normally, the connection to the motor 200 is made through an electromechanical arrangement 211 which controls operating cycle times of the motor 200.

In accordance with the control circuit of FIG. 5, when a drop of water 212 impinges upon the sensing edge 108 of the precipitation sensing element 100 in accordance with the present invention, the resistance value between terminal 2 of the timer circuit 202 and ground potential is momentarily reduced until the water drop 212 is drawn onto the electrodes 102 and 104 of the sensing element 100 by means of surface tension of the drop 212.

The momentary reduction in the resistance value between the terminal 2 of the timer circuit 202 and ground potential causes a trigger pulse to be generated which activates the timer circuit 202 to generate an appropriate positive-going output signal on terminal 3 of the timer circuit 202. The output signal from the timer circuit 202 on the terminal 3 activates the transistor 206 to in turn energize the relay coil 210 of the relay 208.

The relay coil 210 is activated for a sufficient period of time to provide a control signal to the motor 200 such that the motor 200 is activated to cause a complete operating cycle of the associated windshield wipers (not shown) of the associated motor vehicle (not shown). It is noted that this time period need not be equivalent to the entire time required to complete an operating cycle of the windshield wipers since most currently available windshield wiper systems include an internal electromechanical arrangement 211 to complete an operating cycle of the windshield wipers once the cycle has been initiated.

FIGS. 6 and 7 show an alternate embodiment of an improved precipitation sensor 100 in accordance with the present invention wherein selected alternate segments 300 of the first and second electrodes 102 and 104 adjacent to the sensing edge 108 have been removed. It is noted that the sensitivity of the sensor embodiment of FIGS. 6 and 7 may be selectably varied by increasing or decreasing the number of segments along the sensing edge 108 to increase and decrease, respectively, the resulting sensitivity of the element.

The embodiment of FIGS. 6 and 7 shows the remaining alternating segments 302 as having a zero percentage overlap with remaining diagonally opposite segments 302 on the opposite side of the sensing element 100. However, the sensitivity of a given element as shown in FIGS. 6 and 7 can be increased by expanding the remaining segments 302 such that a selected percentage overlap is provided between diagonally opposite segments on opposite sides of the element. Such a segment overlap 303 is shown in FIG. 7A.

Another alternate embodiment of an improved sensing element 100 in accordance with the present invention is shown in FIGS. 8 and 9. In this embodiment, the first and second electrode means comprise first and second wires 400 and 402 which are embedded into opposite sides of an insulating material sheet 106 near one edge thereof to define the sensing edge 108 for the element. In view of the disclosure of the present application, additional modifications and embodiments will be apparent to those skilled in the art and such modifications and embodiments should be considered to be included within the scope of the present invention.

FIGS. 10–12 illustrate sensor element holder means which are preferred for holding the improved sensor elements of the present invention. A sensor element holder 500 comprises a generally rectangular block 502 which preferably comprises left and right half sections 504A and 504B as shown in FIGS. 11 and 12 which are identical to one another to reduce manufacturing and inventory costs. One of the block half sections 504 is shown in perspective view in FIG. 13.

An open trough 508 is formed into the upper surface of the holder 500 for receiving an improved sensing element 100. The upper edges of the generally rectangular block 502 are truncated to provide downwardly sloping surfaces 509 and 510 which serve to divert a portion of the precipitation which could otherwise be deflected onto the sensor element 100.

Figure 13:
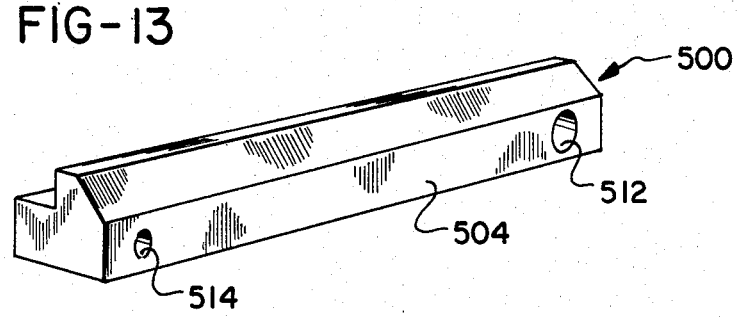
FIG. 13 is a perspective view of one of two substantially identical block half sections which are interconnected to form the holder of FIGS. 10-12.

The substantially identical block half sections 504 each include a hole 512 formed through the right end thereof as viewed in FIGS. 10 and 13 and a smaller hole 514 formed through the left end. The block halves 504A and 504B are interconnected by means of screws 515 which threadedly engage brass cylinders 516 inserted into the holes 512. Initially, the block half sections 504A and 504B are separated and a sensor element 100 is received therebetween. The element 100 is supported in a cantilevered fashion in the approximate center of the trough 508 such that the sensing edge 108 is extended within the trough 508 at the distal end of the element 100.

Holes or notches 518 as shown in FIG. 10 are formed into the ends of the sensor elements 100 such that the screws 515 clear the electrodes 102 and 104 of the elements 100, but the brass cylinders 516 engage and make electrical contact with an abutting electrode 102 or 104. After the block half sections 504A and 504B are secured together, electrode interconnections are made by screws 519 which threadedly engage the outer ends of the brass cylinders 516. The screws 519 secure electrical connecting terminals 520 to the brass cylinders 516 to provide convenient electrical access to the electrodes 102 and 104 of the precipitation sensing elements 100. Of course, wires such as the wires 102B,104B; 400,402 of FIGS. 6 and 8, respectively, or lugs, such as the lugs 102A and 104A of FIG. 1, can be interconnected to the terminals 520 or otherwise converted to provide electrical access to the electrodes 102 and 104.

The holder 500 facilitates mounting of improved precipitation sensing elements on a motor vehicle. It is noted that since the precipitation sensing elements of the present invention are self-clearing, they may be mounted at locations on the vehicle other than the windshield, provided the elements still receive approximately the same amount of precipitation as does the windshield.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A windshield wiper control system for activating the windshield wipers of a motor vehicle in response to precipitation, said control system comprising:

an improved precipitation sensing element comprising:

first and second electrode means for signaling the presence of precipitation;

electrically insulating means for separating said first and second electrode means, said electrically insulating means comprising an electrically insulating material which is impervious to said precipitation, and being formed to define a thin edge of said electrically insulating material, said first and second electrode means being secured to said electrically insulating means at opposite sides of said thin edge such that at said thin edge of said material said first and second electrodes are separated thereby and in gapless contact therewith to form a precipitation sensing edge, said electrically insulating means and said first and second electrode means being otherwise sized to make said precipitation sensing element sufficiently rigid for cantilevered support thereof to present said sensing edge for contact by said precipitation whereby said first and second eletrode means normally present a first resistance therebetween, which first resistance is substantially lowered upon impingement of precipitation on said sensing edge for a momentary period of time until said precipitation is conducted away from said sensing edge by the effects of surface tension; and wiper control circuit means connected to said precipitation sensing means for sensing the momentary lowered resistance between said first and second electrode means to generate a windshield wiper activating signal.

2. A windshield wiper control system as claimed in claim 1 wherein said first and second electrode means comprise first and second wires embedded into opposite sides of said electrically insulating means near said thin edge thereof to define said sensing edge.

3. A windshield wiper control system as claimed in claim 1 wherein said electrically insulating means comprises a thin, substantially planar sheet of said electrically insulating material.

4. A windshield wiper control system as claimed in claim 3 wherein said first and second electrode means comprise substantially planar first and second metallic electrodes substantially coextensive with said insulating material sheet.

5. A windshield wiper control system as claimed in claim 4 wherein said first and second metallic electrodes are tapered toward said sensing edge to increase the mechanical strength of said sensing element but not the width of said sensing edge.

6. A windshield wiper control system as claimed in claim 4 wherein selected alternate segments of said first and second metallic electrodes adjacent to said sensing edge are removed, the sensitivity of the resulting sensing element being selectable by increasing or decreasing the number of segments along said sensing edge to increase and decrease the resulting sensitivity, respectively.

7. A windshield wiper control system as claimed in claim 6 wherein said alternate segments are expanded to permit a selected percentage of overlap between remaining diagonally adjacent segments located on opposite sides of said sensing element.

8. A windshield wiper control system as claimed in claim 7 further comprising sensing element holder means for support of said sensing element, said holder means comprising a generally rectangular block having a trough formed in one side thereof, sensing element securing means for securing said sensing element to extend in cantilevered fashion from approximately the center of the bottom of said trough in line therewith, the edges of said trough extending to at least the sensing edge of said sensing element whereby said sensing element is protected from potentially damaging contacts and said sensing edge is exposed to sense precipitation.

9. A windshield wiper control system as claimed in claim 2 further comprising sensing element holder means for support of said sensing element, said holder means comprising a generally rectangular block having a trough formed in one side thereof, sensing element securing means for securing said sensing element to extend in cantilevered fashion from approximately the center of the bottom of said trough in line therewith, the edges of said trough extending to at least the sensing edge of said sensing element whereby said sensing element is protected from potentially damaging contacts and said sensing edge is exposed to sense precipitation.

10. A windshield wiper control system as claimed in claim 5 further comprising sensing element holder means for support of said sensing element, said holder means comprising a generally rectangular block having a trough formed in one side thereof, sensing element securing means for securing said sensing element to extend in cantilevered fashion from approximately the center of the bottom of said trough in line therewith, the edges of said trough extending to at least the sensing edge of said sensing element whereby said sensing element is protected from potentially damaging contacts and said sensing edge is exposed to sense precipitation.

11. A windshield wiper control system as claimed in claim 1 wherein said wiper control circuit means comprises switch means for connecting power to activate the windshield wipers of a motor vehicle and sensor monitoring means for activating said switching means in response to said momentary lowering of the electrical resistance between said first and second electrode means, said sensor monitoring means stretching said momentary period of lowered resistance to a period of time sufficient to effect operation of said windshield wipers through a complete operating cycle.

12. In a windshield wiper control system for activating the windshield wipers of a motor vehicle in response to precipitation sensed by an improved precipitation sensing element and including wiper control circuit means connected to said precipitation sensing element for operating said windshield wipers in response to sensed precipitation, an improved precipitation sensing element comprising:

electrically insulating means comprising an electrically insulating material which is impervious to said precipitation and is formed to define a thin edge of said electrically insulating material; and first and second electrode means for signaling the presence of precipitation, said first and second electrode means being secured to said electrically insulating means at opposite sides of said thin edge such that at said thin edge of said material said first and second electrodes are separated thereby and in gapless contact therewith to form a precipitation sensing edge, said electrically insulating means and said first and second electrode means being otherwise sized to make said precipitation sensing element sufficiently rigid for cantilevered support thereof to present said sensing edge for contact by said precipitation whereby said first and second electrode means normally present a first resistance therebetween, which first resistance is substantially lowered upon impingement of precipitation on said sensing edge for a momentary period of time until said precipitation is conducted away from said sensing edge by the effects of surface tension whereby said improved precipitation sensing element is self-clearing.

13. An improved precipitation sensing element as claimed in claim 12 wherein said electrically insulating means comprises a thin, substantially planar sheet of said electrically insulating material.

14. An improved precipitation sensing element as claimed in claim 13 wherein said first and second electrode means comprise substantially planar first and second metallic electrodes substantially coextensive with said insulating material sheet.

15. An improved precipitation sensing element as claimed in claim 14 wherein said first and second metallic electrodes are tapered toward said sensing edge to increase the mechanical strength of said sensing element but not the width of said sensing edge.

16. An improved precipitation sensing element as claimed in claim 15 wherein selected alternate segments of said first and second metallic electrodes adjacent to said sensing edge are removed, the sensitivity of the resulting sensing element being selectable by increasing or decreasing the number of segments along said sensing edge to increase and decrease the resulting sensitivity, respectively.

17. An improved precipitation sensing element as claimed in claim 16 wherein said alternate segments are expanded to permit a selected percentage of overlap between remaining diagonally adjacent segments located on opposite sides of said sensing element.

18. An improved precipitation sensing element as claimed in claim 12 wherein said first and second electrode means comprise first and second wires embedded into opposite sides of said electrically insulating means near said thin edge thereof to define said sensing edge.

19. An improved precipitation sensing element as claimed in claim 17 further comprising sensing element holder means for support of said improved sensing element, said holder means comprising a generally rectangular block having a trough formed in one side thereof, sensing element securing means for securing said sensing element to extend in cantilevered fashion from approximately the center of the bottom of said trough in line therewith, the edges of said trough extending to at least the sensing edge of said sensing element whereby said sensing element is protected from potentially damaging contacts and said sensing edge is exposed to sense precipitation.

20. An improved precipitation sensing element as claimed in claim 18 further comprising sensing element holder means for support of said sensing element, said holder means comprising a generally rectangular block having a trough formed in one side thereof, sensing element securing means for securing said sensing element to extend in cantilevered fashion from approximately the center of the bottom of said trough in line therewith, the edges of said trough extending to at least the sensing edge of said sensing element whereby said sensing element is protected from potentially damaging contacts and said sensing edge is exposed to sense precipitation.

21. An improved precipitation sensing element as claimed in claim 19 wherein said electrically insulating sheet material is formed of tetrafluoroethylene.

22. An improved precipitation sensing element as claimed in claim 20 wherein said electrically insulating sheet material is formed of tetrafluoroethylene.

* * * * *